United States Patent [19]

Rickelton et al.

[11] Patent Number: 4,909,939

[45] Date of Patent: Mar. 20, 1990

[54] PROCESS FOR SOLVENT EXTRACTION USING PHOSPHINE OXIDE MIXTURES

[75] Inventors: William A. Rickelton, Niagara Falls; Allan J. Robertson, Thorold, both of Canada

[73] Assignee: American Cyanamid Company, Stamford, Conn.

[21] Appl. No.: 28,851

[22] Filed: Mar. 23, 1987

Related U.S. Application Data

[62] Division of Ser. No. 631,429, Jun. 16, 1984.

[51] Int. Cl.$^4$ .............................................. B01D 11/04
[52] U.S. Cl. .................................... 210/634; 210/511
[58] Field of Search ...................... 210/633, 638, 634; 568/918

[56] References Cited

U.S. PATENT DOCUMENTS 4,237,100 12/1980 Delvalle ........................ 210/243 X
4,544,779 10/1985 Bright ............................. 568/918 X
4,664,808 5/1987 Kim .................................... 210/638

Primary Examiner—Frank Spear
Attorney, Agent, or Firm—Frank M. Van Riet

[57] ABSTRACT

A process for the removal of difficult-to-remove acidic organic compounds from aqueous solutions using novel phosphine oxide mixtures in which mixtures (1) at least two phosphine oxides are present, the total number of carbon atoms in a first oxide being at least 15 and the difference in the total number of carbon atoms in the first and second oxides being present in an amount of at least 5% by weight and not more than 60% by weight or (2) at least four phosphine oxides are present, the total number of carbon atoms in an oxide having at least no. of C atoms being at least 15, said phosphine oxides being present in an amount of at least 1% by weight and not more than 60% by weight. Unexpectedly high extractability is achieved using the mixtures.

17 Claims, No Drawings

PROCESS FOR SOLVENT EXTRACTION USING PHOSPHINE OXIDE MIXTURES

This is a division of application Ser. No. 631,429, filed July 16, 1984.

The present invention relates to the removal of acidic organic compounds from aqueous solution and in particular to the use of phosphine oxide mixtures of two or more such oxides without the use of a diluent for the removal of lower carboxylic acids and phenolic compounds from commercial effluent.

The treatment of aqueous effluent for removal of contaminants and also the recovery of valuable compounds from solution is a most essential part of modern chemical plants. A number of procedures are used such as steam-stripping and the somewhat more complicated solvent extraction, the latter technique being largely dependent upon the properties of the compounds to be recovered. The choice of solvent is critical and solvent loss must be minimized.

Some organic compounds such as acetic acid and phenol in dilute aqueous solutions are particularly difficult to remove. It is known to extract acetic acid using esters or ketones as solvent. However, the equilibrium distribution coefficient, $K_d$ (weight fraction of solute in solvent phase/weight fraction in aqueous phase, at equilibrium) for acetic acid with these solvents is about 1.0 or less. This low $K_d$ necessitates relatively high solvent flow rates in the extraction process and recovery with these solvents is not economically attractive when there is less than 3 to 5 wt. % of acid in the aqueous solution.

Alternative, and somewhat improved solvent systems have been obtained by the use of certain organophosphorous compounds and in particular phosphine oxides in a diluent. These extractant/diluent systems are disadvantageous, however, since the presence of a diluent (which is often necessary in order that higher melting point extractants can be used) effectively reduces the concentration of extractant and also hinders subsequent stripping operations by volatilizing concurrently with the compound which has been removed from aqueous solution.

The use of 100% extractant as solvent without the use of a diluent is therefore desirable but is limited by the melting point of the extractant and the economic operating temperatures at which removal is conducted. In particular the use of neat trialkylphosphine oxides is known but their relatively high melting points require that the removal operation be carried out at above ambient temperatures thus incurring the risk of freeze up during plant malfunction.

It has now been unexpectedly discovered that by use of trialkylphosphine oxides mixtures, not only is the melting point at a more acceptable level but that the ability of the mixture to extract acidic organic compounds from dilute aqueous solutions is high. The mixtures provide unexpectedly high extraction coefficients for weakly extracted compounds such as acetic acid. The organic phose with removed compound can be stripped using several methods such as distillation or stripping with an alkali solution.

Thus, according to the present invention, there is provided a process for removing an acidic organic compound selected from the group consisting of a substituted or unsubstituted carboxylic acid having one to five carbon atoms and a substituted or unsubstituted phenolic compound from a dilute aqueous solution which comprises contacting said aqueous solution with a mixture of (1) at least two phosphine oxides, where a first phoephine oxide has the formula:

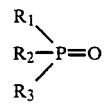

and a second phosphine oxide has the formula:

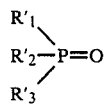

wherein $R_1$, $R_2$, $R_3$, $R'_1$, $R'_2$, and $R'_3$ are individually selected from the group consisting of alkyl, cycloalkyl, aralkyl and substituted aralkyl, each having $C_4$-$C_{18}$, and the total number of carbon atoms in said first phosphine oxide is at least 15, and the total number of carbon atoms in said second phosphine oxide is at least 17, the difference in the total number of carbon atoms in the first and second oxides being at least 2, at least one said phosphine oxide being present in an amount of at least 5% by weight and not more than 60% by weight, or (2) at least four phosphine oxides, having the formulae: $R''_3PO$, $R'''_3PO$, $R''_2R'''PO$, $R''R'''_2PO$ wherein $R''$ and $R'''$ are individually selected from the group consisting of alkyl, cycloalkyl, aralkyl and substituted aralkyl, each having $C_4$-$C_{18}$, and the total number of carbon atoms in each phosphine oxide is at least 15 and preferably at least 18, said phosphine oxides being present in an amount of at least 1% by weight and not more than 60% by weight.

Preferably, the total number of carbona toms in said second phosphine oxide of mixture (1) is at least 19 and the difference in the total number of carbon atoms in the first and second oxides is at least 4.

More preferably at least one phosphine oxide of mixture (1) is present in amount of between about 25–45 wt. % and said mixtures of phosphine oxide has a melting point below about 50° C.

Preferably, the total number of carbon atoms in a second phosphine oxide of mixture (2) having the second lowest number of carbon atoms is at least 20 when the total number of carbon atoms in a first phosphine oxide having the lowest number of carbon atoms is 18, the difference in the total number of carbon atoms between the first oxide and the oxide with the highest number of carbon atoms being at least 6.

More preferably at least one phosphine oxide in mixture (2) is present in amount of between about 35–50 wt. % and said mixtures of phosphine oxides have a melting point below about 20° C., more usually below about 10° C.

While the process of the present invention is believed to be useful with a variety of valuable pollutants or impurities in dilute aqueous streams, it is particularly useful for acidic organic compounds such as carboxylic acids and phenolic compounds. In particular the process is used for removing carboxylic acids having one to five carbon atoms, preferably acetic, propionic, butyric and valeric acids (commonly found in industrial effluents) and also phenol. The carboxylic acids may be substituted by one or more halogen, hydroxyl, cyano or alkoxyl groups. Other specific acids which may be removed by the process of the present invention are exemplified by hexanoic, heptanedoic, octanoic, nonanoic, benzoic, succinic, oxalic, malic, lactic, cyanoacetic, glycolic, and maleic acids. Phenolic compounds subject to the instant invention include those substituted by one or more alkyl groups. Examples of phenolic compounds which can be removed from dilute aqueous streams include p-cresol, resorcinol, 1-naphthol, 2-naphthol, o-, m- and p-xylenol and unsubstituted or substituted hydroquinone, phloroglucinol and pyrogallol.

The compound or compounds removed from dilute aqueous solution can be present in any low or moderately low amount in the dilute solution, although usually in an amount less than 5 wt.% and more likely than 2 wt. % or even 1 wt. %.

The process of the present invention is particularly useful for the recovery of carboxylic acids from paper mill and synthetic fuel oil plants effluents. The process is also valuable for the recovery of phenol from phenolic resin production effluent and in coal gasification. It is believed that the recovery of organic and inorganic compounds which are only normally weakly extractable (e.g. Sb, As, Bi compounds) can be carried out by the process of the present invention.

In the phosphine oxides, when one or more R or R" groups are alkyl, preferred alkyls include about $C_4$ to about $C_{18}$ straight and branched chain alkyls while preferred cycloalkyls include six carbon to eight carbon substituted or unsubstituted cycloalkyls.

Examples of suitable phosphine oxides useful as mixture 1) include, but are not limited to, tri-n-hexylphoephine oxide (THPO), tri-n-octylphosphine oxide (TOPO), tris(2,4,4-trimethylpentyl)-phosphine oxide, tricyclohexylphosphine oxide, tri-n-dodecylphosphine oxide, tri-n-octadecylphosphine oxide, tris(2-ethylhexyl)phosphine oxide, di-n-octylethylphoephine oxide, di-n-hexylisobutylphosphine oxide, octyldiisobutylphosphine oxide, tribenzylphoephine oxide, di-n-hexylbenzylphosphine oxide, di-n-octylbenzylphosphine oxide, 9-octyl-9-phoephabicyclo [3.3.1]nonane-9-oxide, and the like. TOPO and THPO are preferred oxides in a two part mix.

While one oxide of mixture (1) should be present in an amount of at least 5 wt. % and not more than 60 wt. %, a preferred amount is between about 25–45 wt. % and more preferably about 35 wt. %. Although a number of phosphine oxides can be used in mixture (1) it is most convenient to use a two part mix. A particularly preferred two part mix is tri-n-octyl-phosphine oxide (TOPO) together with tri-n-hexyl-phosphine oxide (THPO) the preferred ratio for the TOPO/THPO mixture is 35/65 wt. %. However a synergistic effect to give unexpectedly increased $K_d$ values may be obtained with two or more part mixes of the above named phosphine oxide.

The phosphine oxides used in mixture (1) are selected so that the difference in the total number of carbon atoms in the first and second oxides is at least 2, and preferably at least 4 and more preferably 6 or 8.

Preferably the melting point of mixture (1) is below about 60° C. which is the usual upper temperature at which commercial effluent solutions are treated by liquid/liquid extraction processes. However, it is desirable that the melting point be lower in order to improve the efficiency and costs of the process. A melting point of about 50° C. is preferable and thus a phosphine oxide mix melting below about 50° C., and more preferably 30° C. or 25° C., will from a practical viewpoint be selected for use in the process provided its ability to extract the acidic organic compound is acceptable. The most preferred mixture of TOPO/THPO in a 35/65 wt. % ratio melts at about 16° C.

Examples of suitable phosphine oxides useful as mixture (2) include those specified above for mixture (1). In addition, the following phosphine oxides may also be used: dihexylmonooctylphosphine oxide, dioctylmonohexylphosphine oxide, dihexylmonodecylphosphine oxide, didecylmonohexylphosphine oxide, dioctylmonodecylphosphine oxide, didecylmonooctylphosphine oxide, and dihecylmonobutylphosphine oxide.

While all oxides should be present in mixture (2) in an amount of at least 1 wt. % and not more than 60 wt. %, a preferred amount for at least one said oxide is between about 1.5–10.0 wt. %. Although more than four phosphine oxides can be used in mixture (2), it is most convenient to produce a quaternary mix from two olefinic compounds. A particularly preferred four part mix is tri-n-octyl-phosphine oxide (TOPO); tri-n-hexyl-phosphine oxide (THPO); dihexylmonooctylphosphine oxide and dioctylmonohexylphosphine oxide. However a synergistic effect to give unexpectedly increased $K_D$ values may be obtained with four or more part mixes of the above named phosphine oxide.

The phosphine oxides used in mixture (2) are selected so that the difference in the total number of carbon atoms in at least two of the oxides is at least 2, and may be up to 6 or more.

Preferably the melting point of mixture (2) is below about 20° C. However, it is desirable that the melting point be still lower in order to improve the efficiency and costs of the process and also provide materials handling advantages. A melting point of less than about 10° C. is preferable and thus a phosphine oxide mix melting below about 10° C., and more preferably 0° C.±5° C., will from a practical viewpoint be selected for use in the process provided its ability to extract the acidic organic compound is acceptable.

Apart from the energy savings obtainable by the use of a low melting point phosphine oxide mixture, other advantages of low m.p. mixtures include the avoidance of diluent to be used so that the phosphine oxides can be used neat, and also the avoidance of the possibility of freeze up during plant malfunction. The low m.p. eutectic mixture of phosphine oxides also permits, by virtue of depressed m.p. phosphine oxides to be used which previously could only be used at increased temperatures or together with a diluent, the latter use frequently complicating subsequent stripping operations.

Additionally, a preferred quaternary phosphine oxide mixture (2) prepared from hexene and octene has only about 20% of THPO as compared with a preferred binary phosphine oxide mixture of THOP/TOPO which has about 70% THOP. Since THPO is more soluble in water than is desirable, the preferred quaternary phosphine oxide mixture with less THPO is clearly less soluble in the aqueous solution from which the acidic organic compounds are extracted and thus is advantageous over the binary system.

However, the principal advantage of the phosphine oxide mixtures used in the process of the present invention is the unexpectedly increased extractability provided by such mixtures.

This extractability exceeds that of an equal amount of one phosphine oxide when used alone and thus provides for operational savings in amount of phosphine oxide required to extract a desired solute from dilute aqueous solution.

A preferred phosphine oxide mixture (2) may be prepared by reacting two or more olefinic compounds, such as pentene, hexene, octene and decene, with phosphine. The intermediate tertiary phosphine product from two olefinic compounds, such as octene and hexene, is oxidized with hydrogen peroxide to provide a four-component, trialkylphosphine oxide mixture i.e. $R''_3PO$; $R'''_3PO$; $R''_2R'''PO$; $R''R'''_2PO$. Depending upon the olefinic compound (octene/hexene) ratio, the mixture may be a liquid at room temperature, e.g. the freezing point of a 70% by weight hexene: 30% by weight octene mix is approximately 0° C. For practical, handling reasons, the mixture is liquid at room temperature. For example, a nine part mix obtained from hexene, octene and decene has been found to be particularly convenient and effective.

The present invention will now be described in more detail with reference to examples provided by way of illustration only.

EXAMPLE 1

Samples of solvent were tested for extractibility of acetic acid and also phenol from dilute aqueous solution. Each solvent sample was shaken and mixed with a fixed amount of aqueous solution containing acetic acid. After several minutes the aqueous phase and organic phase were allowed to separate and the aqueous phase analyzed for acetic acid presence. The procedure was repeated with the aqueous phase until all acetic acid had been recovered and passed into the organic phase. The amount, by volume, or organic phase (solvent) required for 100% recovery is indicated by the aqueous/organic (A/O) ratio.

| | Acetic Acid (Commercial Effluent) | |
|---|---|---|
| Sample | Solvent | A/O for 100% Recovery |
| 1 | 150 gpl TOPO in DPA | 0.5 |
| 2 | 400 gpl TOPO in DPA | 0.66 |
| 3 | THPO/TOPO (65/35 wt % ratio) | 2.0 |

| | Phenol (Synthetic Solution) | |
|---|---|---|
| Sample | Solvent | A/O for 100% Recovery |
| 1 | 100 gpl TOPO in Conoco 500 | 2 |
| 2 | 200 gpl TOPO in Conoco 500 | 3 |
| 3 | 325 gpl TOPO in Conoco 500 | 5 |
| 4 | THPO/TOPO (65/35 wt % ratio) | 10 |

Thus in samples 1 and 2, TOPO was dissolved in D.P.A., a commercial diluent supplied by Conoco which is formed of diphenyl alkanes, and it can be seen that an increased amount of TOPO in the solvent requires less organic phase to be used, i.e. the aqueous/organic (A/O) ratio is increased. However, in solvent sample 3, the phosphine oxide mixture (65 wt. %:35 wt. % of THPO:TOPO) gives substantially increased ability to extract the acetic acid. Also, in the phenol extraction, sample 4 gives a substantially increased A/O value thereby clearly indicating that less organic (solvent) phase is necessary for 100% recovery of phenol from the aquoous solution.

EXAMPLE 2

An aqueous commercial waste effluent containing acetic and propionic acid in an amount of 6.15 and 1.50 gpl was extracted using a THPO/TOPO mixture. The equilibrium concentration for each of the carboxylic acids was measured for different A/O ratios.

TABLE I

Carboxylic Acid Extraction from Commercial
Waste Effluent which includes Acetic and Propionic Acid
Solvent (wt %): 65 THPO, 35 TOPO
Temperature: 50° C.

| | Equilibrium Concentration (gpl)* | | | | | |
|---|---|---|---|---|---|---|
| | Acetic | | | Propionic | | |
| A/O | Org. | Aq. | $K_D$ | Org. | Aq. | $K_D$ |
| 5 | 18.3 | 2.50 | 7.3 | 6.15 | 0.27 | 22.8 |
| 2 | 9.70 | 1.30 | 7.5 | 2.78 | 0.11 | 25.3 |
| 1 | 5.54 | 0.61 | 9.1 | 1.47 | 0.03 | 49.0 |

*Based on aqueous analysis and mass balance.
Isotherms for remaining acids in co-incidence with the Y axis.

Additionally, the same effluent was extracted using solvent containing different concentrations of TOPO.

TABLE 2

Carboxylic Acid Extraction from Commercial Waste Effluent
Using 150 and 400 gpl TOPO Solvents
Temperature: 50° C.
Diluent: DPA

| | | Equilibrium Concentration (gpl)* | | | | | |
|---|---|---|---|---|---|---|---|
| | | Acetic | | | Propionic | | |
| Solvent | A/O | Org. | Aq. | $K_D$ | Org. | Aq. | $K_D$ |
| 150 gpl TOPO | 2 | 3.90 | 4.20 | 0.9 | 1.80 | 0.60 | 3.0 |
| in DPA | 1 | 3.45 | 2.70 | 1.3 | 1.15 | 0.35 | 3.3 |
| 400 gpl TOPO | 2 | 5.10 | 2.60 | 2.0 | 2.53 | 0.24 | 10.5 |
| in DPA | 1 | 4.70 | 1.45 | 3.2 | 1.40 | 0.10 | 14.0 |

*Based on aqueous analysis and mass balance.
Isotherms for other acids essentially co-incident with the Y axis.

It is clearly demonstrated that $K_d$ values for the THPO/TOPO mixture are far in excess of the $K_d$ values for the TOPO alone in a diphenyl alkane (DPA) diluent, for corresponding A/O ratios.

EXAMPLE 3

An aqueous solution containing 10 gpl phenol was extracted with solvents having different extractant concentrations.

TABLE 3

Phenol Recovery
The Effect of Extractant Concentration

| Solvents | (1) 100 gpl TOPO in Conoco 500 |
| | (2) 200 gpl TOPO in Conoco 500 |
| | (3) 325 gpl TOPO in Conoco 500 |
| | (4) 65 2/o THPO, 35 w/o TOPO |
| Aqueous Solution | 10 gpl Phenol (nominal) |
| Temperature | 50° C. |

| | Equilibrium Phenol Conc. (gpl) | | | | | | | | | | | |
|---|---|---|---|---|---|---|---|---|---|---|---|---|
| | 100 gpl TOPO | | | 200 gpl TOPO | | | 325 gpl TOPO | | | THPO/TOPO | | |
| A/O | Org. | Aq. | $K_D$ | Org. | Aq. | $K_D$ | Org. | Aq. | $K_D$ | Org. | Aq. | $K_D$ |
| 1 | 10.1 | 0.10 | 101 | 9.84 | 0.04 | 246 | 10.5 | 0.04 | 262 | 9.93 | 0.02 | 497 |

TABLE 3-continued

| 2 | 19.4 | 0.47 | 41 | 19.6 | 0.10 | 196 | 20.9 | 0.08 | 260 | 19.8 | 0.03 | 660 |
| 5 | 34.3 | 3.34 | 10 | 45.0 | 0.87 | 52 | — | — | — | 49.4 | 0.07 | 706 |

The equilibrium phenol concentrations in the organic and aqueous phases for various A/O values was determined and the equilibrium distribution coefficient, $K_d$ calculated. Again it can be seen that the $K_d$ values for the phosphine oxide mixture is unexpectedly higher than the single oxide solvents, for all A/O values.

The next four examples show the use of $C_8/C_6$ mixes and also a $C_{10}/C_6$ mix in the preparation of quaternary phosphine oxide mixtures.

EXAMPLE 4

Phosphine was reacted in an autoclave with an olefin mixture composed of 70% by weight octene and 30% by weight hexene. The intermediate reaction products (tertiary phosphines) were subsequently oxidized with hydrogen peroxide to form the final product containing a mixture of four tertiary phosphine oxides. The product was analyzed and found to contain 3.9% trihexylphosphine oxide, 22.8% dihexylmonooctylphosphine oxide, 45.7% dioctylmonohexylphosphine oxide and 27.6% trioctylphosphine oxide (weight basis). The final product was a liquid at room temperature with a melting range of 8° to 17° C.

EXAMPLE 5

Example 4 was repeated using anolefin mixture composed of 60% by weight octene and 40% by weight hexene. The final tertiary phosphine oxide product was analyzed and found to contain 8% trihexylphosphine oxide, 31.9% dihexylmonooctylphosphine oxide, 42.8% dioctylmonohexylphosphine oxide and 174% trioctylphosphine oxide (weight basis). The final product was a liquid at room temperature with a melting range of minus 5° to 0° C.

EXAMPLE 6

Example 4 was repeated using an olefin mixture composed of 30% by weight octene and 70% by weight hexene. The final product was analyzed and found to contain 40.2% trihexylphosphine oxide, 42.6% dihexylmonooctylphosphine oxide, 15.3% dioctylmonohexylphosphine oxide and 2% trioctylphosphine oxide. The tertiary phosphine oxide mixture was a liquid at room temperature with a melting range of minus 7° to plus 6° C.

EXAMPLE 7

Example 4 was repeated using an olefin mixture composed of 50% by weight decene and 50% by weight hexene. The final product was analyzed and found to contain 22% trihexylphosphine oxide, 42.5% dihexylmonodecylphosphine oxide, 28.9% didecylmonohexylphosphine oxide and 6.4% tridecylphosphine oxide. The final product was a liquid at room temperature with a melting range of minus 5° to plus 10° C.

The following table 4 illustrates that a quaternary phosphine oxide mixture from 70% by weight hexene and 30% by weight octene (example 6) has somewhat improved performance characteristics for use as a solvent extractant when compared with a binary mixture of 65 wt. % THPO/35 wt. % TOPO, although both the binary and quaternary mixtures are superior to the prior art.

TABLE 4
Acetic Acid Extraction Isotherms
Binary and Quaternary Phosphine Oxide Mixtures
Solvents: (1) 70 Hexyl, 30 Octyl Quaternary
(2) 65 Hexyl, 35 Octyl Binary
Aqueous: 10.25 gpl Acetic Acid (synthetic)
Temp.: 50° C.
Time: 5 mins

| | Equilibrium Acetic Acid Concentration (gpl) | | | | | |
|---|---|---|---|---|---|---|
| | 70:30 Quat | | | 65:35 Binary | | |
| A/O | Organic | Aqueous | $K_D$ | Organic | Aqueous | $K_D$ |
| 10 | 52.7 | 4.98 | 10.58 | 47.1 | 5.54 | 8.50 |
| 5 | 32.4 | 3.78 | 8.57 | 28.0 | 4.65 | 6.02 |
| 2 | 16.0 | 2.25 | 7.11 | 15.5 | 2.48 | 6.25 |
| 1 | 8.60 | 1.57 | 5.48 | 8.85 | 1.40 | 6.32 |
| 0.5 | 4.75 | 0.75 | 6.33 | 4.74 | 0.78 | 6.08 |

Thus, when equilibrium acetic acid concentrations in the organic and aqueous phases for various A/O values are used to calculate to $K_D$ values, it can be seen that the $K_D$ values for the quaternary mixture are somewhat higher than for the binary mixture, particularly at high acetic acid loadings (high A/O ratios). Furthermore, interpolations from the acetic acid isotherms, given in Table 4, show complete extraction in 4 stages at A/O=2 for the binary mix. 3 stages at A/O=2 are required when the comparable quaternary is used.

The embodiments of the invention in which an exclusive property or privilege is claimed are defined as follows:

1. A process for removing an acidic organic compound selected from the group consisting of a substituted or unsubstituted carboxylic acid having one to five carbon atoms and a substituted or unsubstituted phenolic compound from a dilute aqueous solution which comprises contacting said aqueous solution with a mixture (1) of at least two phosphine oxides, where a first phosphine oxide has the formula:

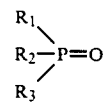

and a second phosphine oxide has the formula:

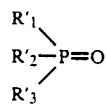

wherein $R_1$, $R_2$, $R_3$, $R'_1$, $R'_2$ and $R'_3$ are individually selected from the group consisting of alkyl, cycloalkyl, aralkyl and substituted aralkyl, each having $C_4$-$C_{18}$, and the total number of carbon atoms in said second phosphine oxide is at least 17, the difference in the total number of carbon atoms in the first and second oxides being at least 2, at least one said phosphine oxide being present in an amount of at least 5% by weight and not more than 60% by weight, or a mixture (2) which is liquid at room temperature of at least four phosphine oxides having the formulae: $R''_3PO$, $R'''_3PO$, $R''_2R'''PO$, $R''R'''_2PO$ wherein $R''$ and $R'''$ are individually selected from the group consisting of alkyl, cycloalkyl, aralkyl and substituted aralkyl, each having $C_4$–$C_{18}$, and the total number of carbon atoms in each phosphine oxides being present in an amount of at least 1% by weight and not more than 60% by weight.

2. A process according to claim 1 wherein the total number of carbon atoms in said second phosphine oxide of mixture (1) is at least 19 and the difference in the total number of carbonatoms in the first and second oxides of mixture (1) is at least 4.

3. A process according to claim 1 wherein said at least one phosphine oxide of mixture (1) is present in amount of between about 25–45 wt. %.

4. A process according to claim 1 or 3 wherein said mixture of phosphine oxides of mixture (1) has a melting point below about 50° C.

5. A process according to claim 1 or 3 wherin said acidic organic compound is selected from the group consisting of acetic acid, propionic acid and phenol.

6. A process according to claim 1 wherein said at least one phosphine oxide of mixture (1) is present in an amount of about 35 wt. %.

7. A process according to claim 1 or 3 wherein said mixture (1) of phosphine oxides has a melting point below about 30° C.

8. A process according to claim 1 wherein said at least one phosphine oxide of mixture (1) is tri-n-octylphosphine oxide.

9. A process according to claim 3 or 5 wherein said mixture (1) of phosphine oxides is tri-n-hexylphosphine oxide and tri-n-octyl phosphine oxide.

10. A process according to claim 1 wherein said mixture (2) of phosphine oxides has a melting point below about 20° C.

11. A process according to claim 1 wherein the total number of carbonatoms in a first of said phosphine oxides of mixture (2) which has the lowest number of carbon atoms is at least 18 and a second of said phosphine oxides of mixture (2) is at least 20, the difference in the total number of carbon atoms in the first oxide of mixture (2) and the oxide with the highest number of carbon atoms of mixture (2) being at least 6.

12. A process according to claim 1 wherein at least one of said phosphine oxides in mixture (2) is present in amount of between about 35–50 wt. %.

13. A process according to claim 1 wherein said mixture (2) of phosphine oxides has a melting point below about 10° C.

14. A process according to claim 1 wherein said mixture (2) of phosphine oxides is tri-n-hexylphosphine oxide, tri-n-octylphosphine oxide, dihexylmonooctylphosphine oxide and dioctylmonohexylphosphine oxide.

15. A process according to claim 1 wherein said mixture (2) of phosphine oxides is tri-n-hexylphosphine oxide, tri-n-decylphosphine oxide, dihexylmonodecylphosphine oxide and didecylmonohexylphosphine oxide.

16. A process according to claim 1 wherein said mixture (2) of phosphine oxides includes at least nine phosphine oxides.

17. A process according to claim 16 wherein hexyl, octyl and decyl groups are present in mixture (2).

* * * * *